Patented July 2, 1935

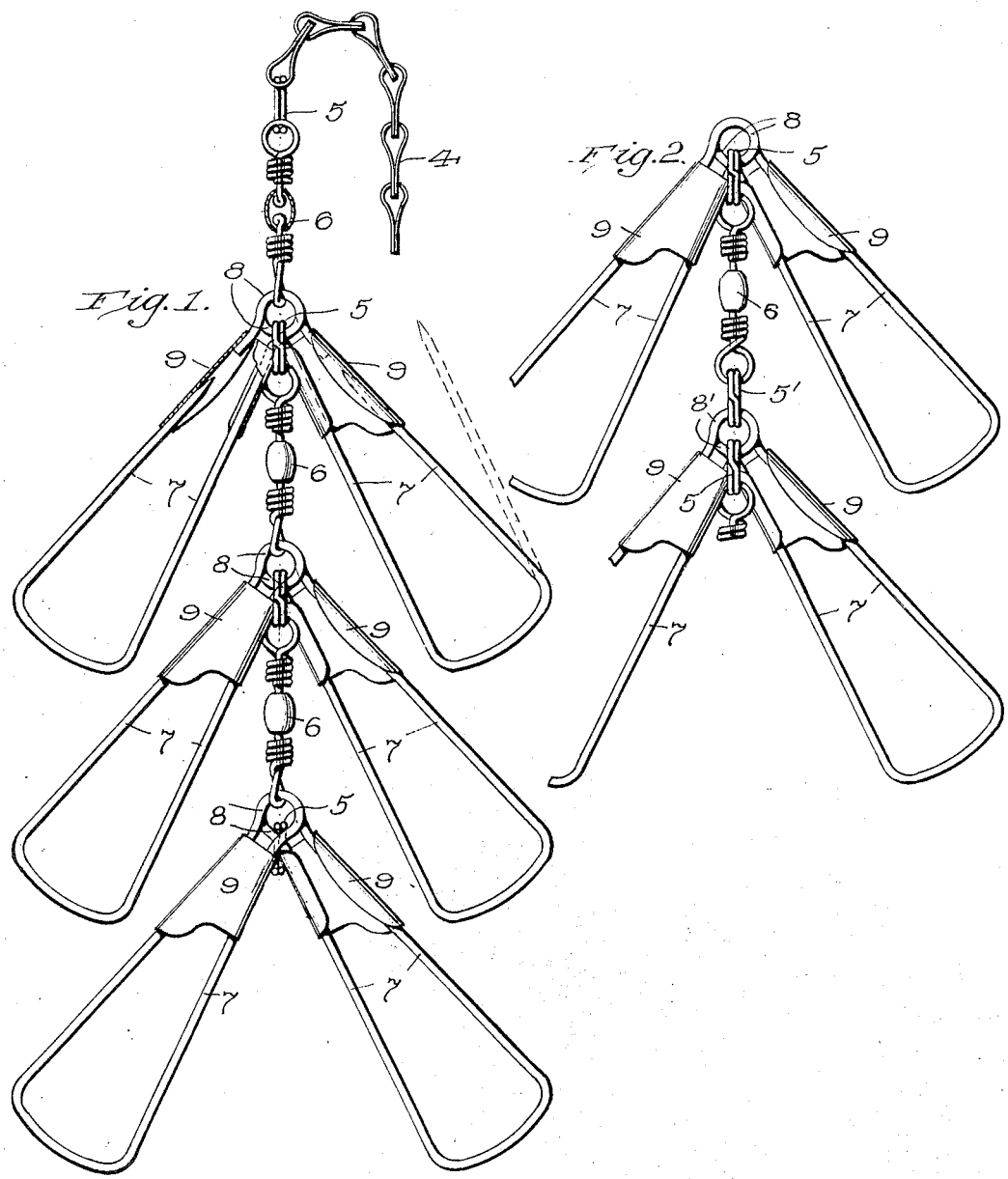

2,007,090

UNITED STATES PATENT OFFICE 2,007,090

FISH STRINGER

William M. Jordan, Birmingham, Ala.

Application September 20, 1933, Serial No. 690,266

10 Claims. (Cl. 224—7)

This invention relates to fish stringers.

The object of the invention is to produce a short and compact fish stringer with a paired hook construction, so arranged that the length and capacity of the stringer may be varied in accordance with varying conditions without interferring with the structural elements of the stringer.

Other objects will appear from the following description when read in connection with the accompanying drawing, in which:—

Fig. 1 is a side view of one form of stringer embodying this invention; and

Fig. 2 is a similar view of a modified construction in which greater spacing may be had between the separate double hook units.

Referring to the drawing, the reference character 4 designates a support for the stringer, here shown as a chain connected by a split ring 5 to a swivel 6. The swivel 6 is of the usual fishing type and comprises two rings, one at the top and one at the bottom.

Connected to the bottom ring of the swivel is a pair of safety snap hooks, each comprising an eye portion 8, a body portion 9, and a pin 7 which is preferably integral with the eye 8 and extends around and engages the body 9, as shown. Each pair of hooks has the two eyes 8 connected to the swivel and held in spaced relation by a split ring 5. This split ring depends between the hooks and limits their relative approach movement. Should the two hooks swing outwardly and upwardly, their approach movement would be limited by the lower ring of the swivel 6.

As a consequence of this construction, it will be noted that the two snap hooks are held in diverging relation and are prevented from approaching each other, so as to entangle. This results in balancing the weight as the loaded stringer is held or pulled up out of the water, and also equalizes the resistance or drag as the loaded stringer is drawn through the water while the boat moves along, as in casting. This equalization of resistance between the two sides of the loaded stringer prevents the circular swinging of the mass of fish as a whole, which movement is soon fatal to the fish on the stringer.

Where single hooks are employed, a circular or swinging movement obtains; whereas, with the use of the present structure, the fish are held on pairs of hooks, each hook of each pair standing in diverging relation to the opposite hook.

It has been found that the presence of swivels does not prevent the swinging or circular movement, above mentioned. Furthermore, in the preferred forms, each hook of a pair is capable of limited relative movement with respect to the other, which is particularly advantageous when one of the hooks carries a fish of much larger size than the other.

Under such conditions, with the ordinary stringer, the larger fish would drag behind as the boat moved forward. On the other hand, when the hooks of a pair are separate and diverging and are capable of limited relative movement, the lateral mobility of the hook carrying the smaller fish permits it to swing toward a quartering position instead of being forced directly forward; hence the smaller fish remains on the upper limb of the hook and in the upright position, whether swimming or passive.

As shown in Fig. 1, the stringer is made up of three pairs of hooks, each pair being connected to the adjacent pair by a swivel, with a split ring interposed between each pair and the adjacent swivel ring. It will be understood that in practice the number of these pairs of hooks may be varied in accordance with the conditions above specified, to change the capacity and length of the stringer, and that the structure of each pair is identical with that of the others.

As a consequence of this construction, each pair of hooks is capable of free rotation relatively to the other pairs and the addition of a pair of hooks can be accomplished at any time by attachment of these hooks to the lowermost of the split rings 5, without disturbing the assembly of the remainder of the stringer.

Stringers of this character are frequently attached to a boat as in trolling or casting, and the double hook construction with the consequent balance, prevents rotation of the stringer through the drag of the fish through the water, whereas a single hook construction could not accomplish this result. The angle of approach between hooks of each pair may be varied by varying the diameter of the rings 5, as well as by employing swivels having rings of varying diameters.

Although in Fig. 1 the stringer is shown as having only a single split ring associated with each pair of hooks, it may have, for the purpose of increasing the space between adjacent paired hook units, two split rings, as shown in Fig. 2.

In this figure, the safety pin snaps 7 are of the same construction as those shown in Fig. 1, and a similar chain 4 will be employed. Likewise, the eyes 8 of these pins are connected to a depending split ring 5 which limits their approach movement.

The upper ring of swivel 6 is connected to this split ring but, in addition, the lower ring of the swivel 6 carries another split ring 5' which engages the eyes 8' of the next pair of hooks. Consequently, the length of each stringer unit is increased by the diameter of the split ring 5' and the approach movement of the hooks of the bottom pair is limited at the top by the ring 5', and at the bottom by the ring 5, as before.

It will be understood that any desired number of hook pairs may be employed in accordance with requirements.

It will also be understood that the invention above described not only provides a fish stringer which can be readily changed in length and capacity, but one in which the fish on opposite hooks of each pair are in balanced relation. Consequently, when the loaded stringer is being dragged through the water, tendency to cause entanglement and rotation as a whole is reduced to a minimum.

Likewise, a stringer of the paired hook construction has twice the capacity of a single hook stringer of the same length. This decrease in over-all length materially diminishes the chance of fouling the loaded stringer on marine obstructions, and at the same time produces a better balance of the load, whether it be drawn through the water or carried in the hand.

While in this specification the hooks have been referred to as snap hooks or safety snaps, this term is not to be limited to the precise details shown, but is intended to cover equivalent hook structures so long as they are of the safety type and are of more or less rigid construction, to prevent adjacent hooks of a pair from becoming entangled.

Although only a few forms of the invention have been shown and described, it will be obvious that various changes may be made in the details of construction, without departing from the spirit and scope of the invention as defined in the claims.

What is claimed is:—

1. A fish stringer comprising a plurality of safety hook units, each comprising a pair of oppositely disposed safety hooks; a swivel connection between each pair of hooks and the adjoining pair; and means for limiting the relative movement of each hook of a unit with respect to the associated hook.

2. A fish stringer comprising a plurality of pairs of safety snaps, the snaps of each pair being disposed in inclined relation to each other; a swivel connection between adjacent pairs of snaps; and means comprising a split ring for limiting the approach of one snap of each pair toward the associated snap.

3. A fish stringer comprising a supporting element; a plurality of snap hooks arranged in pairs; a swivel connection between the support and one of the pairs of hooks; and means for holding the hooks of each pair in spaced relation to each other, but permitting limited relative movement between them.

4. A fish stringer comprising a support; a swivel on said support; a pair of snap hooks connected to said swivel; and a single split ring interlocked with each of said hooks to limit the approach movement of one hook relative to the other, and forming a means for varying the capacity of the stringer.

5. A fish stringer comprising a support; a plurality of pairs of separate snap hooks, one of said pairs being swivel connected to said support; a swivel between adjacent pairs of hooks; and a pair of split rings connected to each pair of hooks to limit their relative movement.

6. A fish stringer comprising a plurality of pairs of snap hooks; a plurality of split rings for connecting the hooks of each pair together and limiting their relative movement; and a swivel connection between each split ring of one pair of hooks and a split ring of the adjacent pair of hooks.

7. A fish stringer comprising a plurality of pairs of devices each device being adapted to receive and hold a fish; a swivel connection between adjacent pairs of such devices; and means for limiting the relative movement of the devices of each pair toward and away from one another.

8. A fish stringer comprising a plurality of units, each comprising a pair of oppositely disposed fish holding elements secured to the same support; means for holding the elements of each pair in spaced relation, said means preventing rotation of the same about the longitudinal axis of a fish held thereon and a swivel connection between adjacent supports for securing said units in series.

9. A fish stringer comprising a plurality of hook units, each composed of two hooks held in inclined spaced relation to one another; swivel connections between adjoining units; and a split ring connecting each hook unit to its associated swivel to permit varying the length and capacity of the stringer, said ring being interlocked with both hooks of the unit to preserve the spaced relation of the hooks with respect to one another.

10. A fish stringer comprising a flexible elongated support; a plurality of pairs of safety snap hooks swiveled to said support and capable of rotational movement about the axis of said support, the hooks of each pair being inclined to the axis of said support and to each other and capable of limited movement in planes passing through the axis of the support; and a single means for limiting the approach movement of the hooks of each pair and for preventing rotation of said hooks about axes inclined to the axis of the support.

WILLIAM M. JORDAN.